United States Patent Office 3,118,807
Patented Jan. 21, 1964

3,118,807
BONDED FIBROUS INSULATION
Harry E. Holcomb, Stratford, Conn., assignor to Johns-Manville Corporation, New York, N.Y., a corporation of New York
No Drawing. Filed Feb. 25, 1960, Ser. No. 10,852
8 Claims. (Cl. 161—196)

This invention relates to fibrous thermal insulations and more particularly to bonded self-supporting fibrous felts or blankets suitable for direct exposure to flame temperatures.

Combustion chambers for domestic furnaces or the like heating units are commonly lined with dense refractory material such as firebrick or a castable concrete. Such materials, although providing effective and efficient insulation, materially increase the weight of the unit and substantially add to the cost thereof due both to the expense of the material and the labor involved. The lightweight refractory insulations of this invention are especially effective as refractory furnace liners providing a substantial reduction in the weight of a furnace unit as well as material savings in overall cost.

It is a primary object of this invention to provide a relatively low cost, high refractory insulation comprising a felted blanket of high temperature resistant mineral fiber and a binder component which provides strength and integrity throughout all temperatures ranging from ambient to approximately 2500° F.

It is also an object of this invention to provide a binder for refractory mineral wool felts, blankets, and the like fibrous products which does not affect the initial flexibility or handling characteristics of the fibrous insulation and which imparts self-supporting structural strength, integrity, resistance to vibration and flame impingement or erosion at all temperatures up to and in excess of 2000° F.

It is a further object of this invention to provide a low cost, lightweight, efficient and effective furnace combustion chamber liner or material therefor which may be substituted for, or replace conventional high density refractory material.

These and other objects and advantages of the instant invention will become apparent from the hereinafter detailed description.

I have found that thermal insulations comprising conventional refractory mineral fibers in the form of felts, blankets or the like, can be securely bonded and integrated into bodies which are structurally strong, self-supporting and shape retaining by uniformly dispersing therein a binder component comprising a combination of bentonite clay, finely divided soda-lime-silica glass and thermosetting resin. Refractory fiber felts or blankets incorporating about 15 to 20% by weight thereof of such a component comprising approximately 10 to 15 parts by weight of bentonite clay, approximately 3 to 8 parts by weight of powdered glass, and approximately 2 to 7 parts by weight of thermosetting resin, upon initial exposure to temperatures sufficient to cure or set the thermosetting resin, possess the foregoing phycsial properties throughout all temperatures ranging from ambient up to and in excess of approximately 2500° F.

The fibrous component of the subject insulations may comprise substantially any common mineral or glass fiber composition provided, of course, it is sufficiently refractory to withstand the temperatures of the contemplated application. The finely divided glass consists of conventional glass cullet having a softening point in the vicinity of approximately 1200 to 1500° F. Typical of the lower temperature glasses are the common soda-lime-silica glasses, commonly referred to as "lime glasses," utilized in the manufacture of ordinary windows, sheets, plate, and the like products. The resin component comprises any one of the commonly available synthetic thermosetting resins such as phenol, urea, or melamine formaldehyde condensation products, the more heat resistant phenol formaldehyde resins being preferred.

Thermal insulations according to this invention are prepared simply by incorporating or dispersing the clay, finely divided glass, and thermosetting resins uniformly throughout the fibrous felt or blanket by any convenient means commonly utilized in the felting or forming of fibrous mineral or glass wool products. Typically, the particulate binder materials are blown throughout and/or among the individual fibers or clumps thereof during the normal felting operation in order to obtain substantially homogeneous distribution.

Upon exposure to moderately elevated temperatures, i.e., approximately 200 to 500° F., the thermosetting resin cures or sets up integrating the fibrous mass into a strong, handleable mass or shape. Further elevations of the surrounding temperatures, while destroying the resin and its bond, effect a softening, melting and/or fusing of the powdered glass and/or bentonite clay component which results in an effective bonding medium or means throughout temperatures up to approximately 2500° F. Thus, the binder component and/or the thermal reaction products thereof, provide the fibrous material with a strong efficient bond over all normally encountered temperatures.

The following example illustrates the novel fibrous insulation and a method or means for producing the same. It is to be understood that the composition of the fibrous component of the felted product and the specific manipulations or conditions of the recited procedure or method are all exemplary and not to be construed to limit the invention to any particular product or class of products or configurations recited in the hereinafter example.

*Example I*

A binder component comprising 67% by weight of oven dried bentonite clay, 19% by weight of plate glass having a softening point of approximately 1250–1300° F., and approximately 14% by weight of particulate phenol formaldehyde resin (B-stage) was prepared by ball milling said ingredients for two hours. The finely divided ball milled product was uniformly blended with a high refractory fiber, comprising approximately 52% by weight silica, 41% by weight alumina, 5% by weight titania, with the balance iron and other impurities, in ratios of 81.7 parts by weight of fiber to 18.3 parts by weight of binder, and 84.3 parts by weight fiber to 15.7 parts by weight of said binder, by blowing the blended binder components with the fiber into a conventional felting unit. The blended fiber-binder mixtures were formed into 10–12 pound per cubic foot felts ⅜" in thickness. These felts, upon curing of the organic resin binder component by exposure to temperatures of approximately 450–500° F., were cut to fit and line the bottom and side of a cylindrical combustion chamber measuring approximately 9.75" in diameter by 12" in height of an oil fired domestic furnace (i.e., felts from each sample were cut in the pattern of discs 9.75" in diameter to form a combustion chamber bottom and in 12" wide strips long enough to form cylindrical wall insulating members). Each lining unit comprising a bottom and wall member was subjected to simulate service conditions constituting a 10-minute heating cycle which raised the surface temperature of the insulation to 1600° F., followed by a 5-minute cooling cycle in which the temperature was reduced to 350° F., for 2 weeks in an oil fired domestic furnace. Upon completion of the two-week exposure period for each sample, the insulating liners could be easily removed from the furnace chamber and the cylindrical wall sections would support themselves on end. The thus treated felts showed no sign of slumping in use and developed a relatively hard crust to a depth of approximately 1/8".

The products of this invention, as illustrated hereinbefore, provide vibration and heat resistant thermal and sound insulating liners for furnace combustion chambers which are useful either in new units, both gas and oil fired, or as replacement liners for worn, eroded or defective equipment. Replacement liners for old units preferably are combined with back-up elements of suitable heat resistant material such as stainless steel to provide an effective backing and positive fire barrier as a safety measure.

It should be understood that the prior disclosure was for the purposes of illustration only and that this invention includes all modifications and equivalents which come within the scope of the appended claims.

What I claim is:

1. A lightweight, refractory, thermal insulating blanket resistant to thermal decomposition throughout temperatures ranging from ambient up to approximately 2000° F. and composed of a fibrous component of about 80 to 85% by weight of refractory mineral fiber felt and a binder component of approximately 15 to 20% by weight of binder materials which provide strength and integrity throughout all temperatures ranging from ambient to approximately 2000° F. dispersed uniformly throughout the refractory fibers of the felt, said binder materials consisting essentially of approximately 10 to 15 parts by weight of bentonite clay, approximately 3 to 8 parts by weight of finely ground soda-lime-silica glass, and approximately 2 to 7 parts by weight of thermosetting resin.

2. The lightweight, refractory, thermal insulating blanket of claim 1 wherein the thermosetting resin is a phenol-formaldehyde resin.

3. A lightweight, refractory, thermal insulating blanket resistant to thermal decomposition throughout temperatures ranging from ambient up to approximately 2000° F., a density of about 10 to 12 pounds per cubic foot, and composed of a fibrous component of about 80 to 85% by weight of refractory mineral fiber felt and a binder component of approximately 15 to 20% by weight of binder materials which provide strength and integrity throughout all temperatures ranging from ambient to approximately 2000° F. dispersed uniformly throughout the refractory fibers of the felt, said binder materials consisting essentially of approximately 60 to 70 parts by weight of bentonite clay, approximately 15 to 25 parts by weight of finely ground plate glass, and approximately 15 to 20 parts by weight of thermosetting resin.

4. The lightweight, refractory, thermal insulating blanket of claim 3 wherein the thermosetting resin is a phenol-formaldehyde resin.

5. A lightweight, refractory, thermal insulating blanket resistant to thermal decomposition throughout temperatures ranging from ambient up to approximately 2000° F. which consists essentially of a fibrous component of about 80 to 85% by weight of refractory mineral fiber felt and a binder component which provides strength and integrity throughout all temperatures ranging from ambient to approximately 2000° F. dispersed uniformly throughout the refractory fibers of the felt composed of the thermal reaction products of approximately 15 to 20% by weight of binder materials consisting essentially of approximately 10 to 15 parts by weight of bentonite clay, approximately 3 to 8 parts by weight of finely ground soda-lime-silica glass, and approximately 2 to 7 parts by weight of thermosetting resin.

6. A lightweight, refractory, thermal insulating blanket resistant to thermal decomposition throughout temperatures ranging from ambient up to approximately 2500° F., a density of about 10 to 12 pounds per cubic foot, and consists essentially of a fibrous component of about 80 to 85% by weight of refractory mineral fiber felt and a binder component which provides strength and integrity throughout all temperatures ranging from ambient to approximately 2500° F. dispersed uniformly throughout the refractory fibers of the felt composed of the thermal reaction products of approximately 15 to 20% by weight of binder materials consisting essentially of approximately 60 to 70 parts by weight of bentonite clay, approximately 15 to 25 parts by weight of finely ground plate glass, and approximately 15 to 20 parts by weight of phenol-formaldehyde resin.

7. A combustion chamber liner for a furnace comprising the combination of a stainless steel back-up member lined with a lightweight, refractory, thermal insulating blanket resistant to thermal decomposition throughout temperatures ranging from ambient up to approximately 2000° F. and composed of a fibrous component of about 80 to 85% by weight of refractory mineral fiber felt and a binder component of approximately 15 to 20% by weight of binder materials which provide strength and integrity throughout all temperatures ranging from ambient to approximately 2000° F. dispersed uniformly throughout the refractory fibers of the felt, said binder materials consisting essentially of approximately 7 to 15 parts by weight of bentonite clay, approximately 3 to 8 parts by weight of finely ground soda-lime-silica glass, and approximately 2 to 7 parts by weight of thermosetting resin.

8. A combustion chamber liner for a furnace comprising the combination of a stainless steel back-up member lined with a lightweight, refractory, thermal insulating blanket resistant to thermal decomposition throughout temperatures ranging from ambient up to approximately 2000° F. which consists essentially of a fibrous component of about 80 to 85% by weight of a refractory mineral fiber felt and a binder component which provides strength and integrity throughout all temperatures ranging from ambient to approximately 2000° F. dispersed uniformly throughout the refractory fibers of the felt composed of the thermal reaction products of approximately 15 to 20% by weight of binder materials consisting essentially of approximately 10 to 15 parts by weight of bentonite clay, approximately 3 to 8 parts by weight of finely ground soda-lime-silica glass, and approximately 2 to 7 parts by weight of thermosetting resin.

References Cited in the file of this patent

UNITED STATES PATENTS

| | | |
|---|---|---|
| 1,019,407 | Baekeland | Mar. 5, 1912 |
| 2,500,665 | Courtright | Mar. 14, 1950 |
| 2,586,726 | Schuetz et al. | Feb. 19, 1952 |
| 2,632,752 | Anderson | Mar. 24, 1953 |
| 2,633,433 | Hollenberg | Mar. 31, 1953 |
| 2,674,539 | Harter et al. | Apr. 6, 1954 |
| 2,835,107 | Ward | May 20, 1958 |
| 3,001,362 | Runton | Sept. 26, 1961 |
| 3,069,773 | Saffir | Dec. 25, 1962 |